(12) United States Patent
Choi

(10) Patent No.: US 11,877,568 B2
(45) Date of Patent: Jan. 23, 2024

(54) LURE

(71) Applicant: DUEL CO., INC., Fukuoka (JP)

(72) Inventor: Eric Eun-Ha Choi, Fukuoka (JP)

(73) Assignee: DUEL CO., INC., Fukuoka (JP)

( * ) Notice: Subject to any disclaimer, the term of this patent is extended or adjusted under 35 U.S.C. 154(b) by 274 days.

(21) Appl. No.: 17/053,122

(22) PCT Filed: May 17, 2018

(86) PCT No.: PCT/JP2018/019190
§ 371 (c)(1),
(2) Date: Nov. 5, 2020

(87) PCT Pub. No.: WO2019/220602
PCT Pub. Date: Nov. 21, 2019

(65) Prior Publication Data
US 2021/0235677 A1     Aug. 5, 2021

(51) Int. Cl.
*A01K 85/00* (2006.01)
*A01K 85/16* (2006.01)
(Continued)

(52) U.S. Cl.
CPC ........ *A01K 85/1803* (2022.02); *A01K 85/012* (2022.02); *A01K 85/01* (2013.01); *A01K 85/18* (2013.01)

(58) Field of Classification Search
CPC .... A01K 85/012; A01K 85/011; A01K 85/01; A01K 85/18; A01K 85/1803; A01K 85/013; A01K 85/019; A01K 85/026; A01K 85/027; A01K 85/028; A01K 85/029; A01K 85/1807; A01K 85/1811; A01K 85/1813; A01K 85/1817; A01K 85/1821; A01K 85/1823; A01K 85/1827; A01K 85/1831;
(Continued)

(56) References Cited

U.S. PATENT DOCUMENTS

| 1,297,617 | A | * | 3/1919 | Welles | .................. | A01K 85/18 |
| | | | | | | 43/42.23 |
| 2,003,976 | A | * | 6/1935 | Raymond | .............. | A01K 85/14 |
| | | | | | | 43/42.32 |

(Continued)

FOREIGN PATENT DOCUMENTS

| CA | 2496427 | C | * | 9/2010 | ............. | A01K 85/01 |
| CH | 626505 | A5 | * | 11/1981 | | |

(Continued)

OTHER PUBLICATIONS

Gnatkowski, Mike. "Crankbaits Lips And How To Choose Them." Bassresource.com, May 14, 2015, https://www.bassresource.com/fishing/crankbait-lips.html. (Year: 2015).*

(Continued)

*Primary Examiner* — Darren W Ark
*Assistant Examiner* — Angelica Alejandra Almeida Bonnin
(74) *Attorney, Agent, or Firm* — WHDA, LLP

(57) ABSTRACT

A lure 1A of the present invention has a body 2 and a lip part 3 projecting from the body 2, and the lip part 3 is provided (Continued)

with a hologram sheet 4. As the hologram sheet 4 of the lure 1A reflects light while the lure 1A dives and swims in water, a target fish is easily attracted by the lure 1A.

10 Claims, 5 Drawing Sheets

(51) Int. Cl.
  *A01K 85/01* (2006.01)
  *A01K 85/18* (2006.01)
(58) Field of Classification Search
  CPC ............ A01K 85/1833; A01K 85/1837; A01K
         85/1841; A01K 85/1843; A01K 85/1847;
         A01K 85/1851; A01K 85/1853; A01K
         85/1857; A01K 85/1861; A01K 85/1863;
         A01K 85/1867; A01K 85/1871; A01K
         85/1873; A01K 85/1877; A01K 85/1881;
         A01K 85/1883; A01K 85/1887; A01K
         85/1891; A01K 85/1893; A01K 85/1897
  See application file for complete search history.

(56) References Cited

U.S. PATENT DOCUMENTS

| | | | | | |
|---|---|---|---|---|---|
| 2,494,384 | A * | 1/1950 | Gadzinski | ............ | A01K 85/16 43/42.22 |
| 2,578,411 | A * | 12/1951 | Fisher | .................. | A01K 85/16 43/42.32 |
| 2,579,377 | A * | 12/1951 | Flynn | .................... | A01K 85/16 43/42.32 |
| 2,596,883 | A * | 5/1952 | Wise | ...................... | A01K 85/16 43/42.33 |
| 2,674,060 | A * | 4/1954 | Simmons | ............... | A01K 85/18 43/42.47 |
| 2,796,693 | A * | 6/1957 | Gunterman | ............. | A01K 85/14 43/42.32 |
| 3,392,474 | A * | 7/1968 | De Weese | ............... | A01K 85/00 43/42.32 |
| 3,413,750 | A * | 12/1968 | Henry | .................... | A01K 85/10 359/566 |
| 3,631,625 | A * | 1/1972 | Castner | ................. | A01K 85/16 359/489.15 |
| 3,745,685 | A * | 7/1973 | Swarthout | ............... | A01K 85/16 43/42.34 |
| 3,834,058 | A * | 9/1974 | Gaunt | .................... | A01K 85/14 43/42.49 |
| 4,122,624 | A * | 10/1978 | Smith | .................... | A01K 85/14 43/42.5 |
| 4,697,378 | A * | 10/1987 | Tunstall | ................. | A01K 85/16 43/42.22 |
| 4,807,383 | A * | 2/1989 | Delwiche | ............... | A01K 85/00 43/17.5 |
| 4,807,387 | A * | 2/1989 | Dougherty, Jr. | ........ | A01K 85/16 43/42.22 |
| 4,815,229 | A * | 3/1989 | Nicholson, III | ........ | A01K 85/16 43/42.47 |
| 4,891,900 | A * | 1/1990 | Snyder | ................... | A01K 85/14 D22/129 |
| 4,944,112 | A * | 7/1990 | Garmany | ................ | A01K 85/16 43/42.22 |
| 5,077,930 | A * | 1/1992 | Berry | ..................... | A01K 85/14 43/42.22 |
| 5,115,592 | A * | 5/1992 | Renaud | .................. | A01K 85/16 43/42.47 |
| 5,465,524 | A * | 11/1995 | Vallone | .................. | A01K 85/01 43/42.32 |
| 5,490,347 | A * | 2/1996 | Conley | .................. | A01K 85/16 43/42.47 |
| 5,858,494 | A * | 1/1999 | Cherkas | ................. | A01K 85/16 428/40.1 |
| 5,970,648 | A * | 10/1999 | DeRose | ................. | A01K 91/06 43/42.22 |
| 6,182,391 | B1 * | 2/2001 | Hubbard | ................ | A01K 85/00 43/42.34 |
| 6,643,975 | B1 * | 11/2003 | Edwards | ................ | A01K 85/14 43/42.31 |
| 8,196,337 | B2 * | 6/2012 | Simmons | ............... | A01K 85/00 43/42.32 |
| 8,567,109 | B1 * | 10/2013 | Grigorovich | .......... | A01K 85/01 43/42.22 |
| 8,601,737 | B2 * | 12/2013 | Beer | ...................... | A01K 85/01 43/42.31 |
| 8,950,106 | B2 * | 2/2015 | Kaariainen | ............ | A01K 85/14 43/42.23 |
| 2002/0073606 | A1 * | 6/2002 | Mameamskum | ...... | A01K 85/14 43/42.5 |
| 2004/0006909 | A1 * | 1/2004 | Essad | ..................... | A01K 85/16 43/42.22 |
| 2004/0111951 | A1 * | 6/2004 | Reed | ...................... | A01K 85/00 43/42.32 |
| 2005/0028423 | A1 * | 2/2005 | Kaariainen | ............ | A01K 91/06 43/42.5 |
| 2006/0010764 | A1 * | 1/2006 | Frawley | ................ | A01K 85/16 43/42.47 |
| 2006/0042150 | A1 * | 3/2006 | Roh | ....................... | A01K 85/00 43/42.32 |
| 2006/0107582 | A1 * | 5/2006 | Leppala | ................. | A01K 85/16 43/42.34 |
| 2006/0254119 | A1 * | 11/2006 | Siirtola | .................. | A01K 85/16 43/42.47 |
| 2006/0283075 | A1 * | 12/2006 | Feldhege | ............... | A01M 1/14 43/121 |
| 2007/0199233 | A1 * | 8/2007 | Higgin | ................... | A01K 85/16 43/42.31 |
| 2008/0104879 | A1 * | 5/2008 | Poppe | .................... | A01K 97/02 43/2 |
| 2008/0104880 | A1 * | 5/2008 | Hegemier | ............... | A01K 85/01 43/42.32 |
| 2008/0202015 | A1 * | 8/2008 | Langer | ................... | A01K 85/18 43/42.26 |
| 2010/0328741 | A1 * | 12/2010 | Cheverton | ............... | G03H 1/28 359/2 |
| 2011/0247260 | A1 * | 10/2011 | Schwartz | ............... | A01K 91/06 43/42.31 |
| 2011/0296737 | A1 * | 12/2011 | Peluso | ................... | A01K 85/16 43/42.32 |
| 2012/0285073 | A1 * | 11/2012 | Ott | ......................... | A01K 85/12 43/42.34 |
| 2014/0068997 | A1 * | 3/2014 | Choi | ...................... | A01K 85/16 43/42.33 |
| 2014/0150329 | A1 * | 6/2014 | Waldroup | ............... | A01K 85/14 43/42.32 |
| 2014/0360088 | A1 * | 12/2014 | Hamaguchi | ............ | A01K 91/18 43/42.32 |
| 2016/0000056 | A1 * | 1/2016 | Hoffman | ................ | A01K 97/02 156/249 |
| 2017/0156299 | A1 * | 6/2017 | Reyment | ................ | A01K 85/18 |
| 2019/0021299 | A1 * | 1/2019 | Fishback, Jr. | .......... | A01K 85/00 |
| 2019/0045764 | A1 * | 2/2019 | Gibson | ................... | A01K 85/18 |
| 2019/0133099 | A1 * | 5/2019 | Ostruszka | ............... | A01K 85/18 |
| 2019/0150421 | A1 * | 5/2019 | Smith | .................... | A01K 95/00 |
| 2019/0320634 | A1 * | 10/2019 | Kawasaki | ............... | A01K 85/16 |
| 2021/0084874 | A1 * | 3/2021 | Rauch | ................... | A01K 85/00 |
| 2022/0217958 | A1 * | 7/2022 | Olsen | ................ | A01K 85/1863 |

FOREIGN PATENT DOCUMENTS

| | | | | | |
|---|---|---|---|---|---|
| FR | | 3046524 A1 * | 7/2017 | ............ | A01K 85/18 |
| GB | | 2398471 A * | 8/2004 | ............ | A01K 85/01 |
| JP | | 11123037 A * | 5/1999 | | |
| JP | | H11123037 A * | 5/1999 | | |
| JP | | 2000245305 A * | 9/2000 | | |
| JP | | 2001-292662 A | 10/2001 | | |
| JP | | 2005-537031 A | 12/2005 | | |
| JP | | 2006-042633 A | 2/2006 | | |
| JP | | 2006-345851 A | 12/2006 | | |

(56) References Cited

FOREIGN PATENT DOCUMENTS

| JP | 3133684 U | | 7/2007 | |
|---|---|---|---|---|
| JP | 2010-41987 A | | 2/2010 | |
| JP | 2010041987 A | * | 2/2010 | |
| JP | 3189527 U | * | 3/2014 | |
| JP | 3200973 U | * | 11/2015 | |
| WO | WO-2014065737 A1 | * | 5/2014 | ............ A01K 83/06 |

OTHER PUBLICATIONS

Thone, Steve. "Crankbait Fishing Lure (Clear Lip)." 3D Printable Crankbait Fishing Lure (Clear Lip), 2018, https://www.myminifactory.com/object/3d-print-crankbait-fishing-lure-clear-lip-69852. (Year: 2018).*

Vinall, Greg. "Foiling Lures with Holoscale". YouTube. Feb. 12, 2017, https://www.youtube.com/watch?v=3OOr8v8misQ. Accessed Sep. 26, 2022. (Year: 2017).*

Marling Baits. "Testing Different CrankBait Lip Shapes." YouTube video. Sep. 11, 2019. https://www.youtube.com/watch?v=5Gldh2ux9HM. (Year: 2019).*

Office Action dated Dec. 7, 2021, issued in counterpart JP application No. 2020-518907, with English translation. (6 pages).

Office Action dated Nov. 1, 2021, issued in counterpart CN application No. 201880093472.2, with English translation. (10 pages).

International Search Report dated Jul. 24, 2018, issued in counterpart International Application No. PCT/JP2018/019190 (2 pages).

Office Action dated Feb. 15, 2022, issued in counterpart JP Application No. 2020-518907, with English Translation. (5 pages).

\* cited by examiner

LURE

TECHNICAL FIELD

The present invention relates to a fishing lure including a lip part provided with a hologram sheet.

BACKGROUND ART

As described in Patent Literature 1, a lure having a body (lure body) made of a synthetic resin and a transparent lip part, which is made of a synthetic resin, projecting toward a head side of the body has been conventionally known.

The lip part is also referred to as a resistance plate and comes under pressure of water when the lure is pulled in water. When the lure having with a lip part is pulled in water, the lip part creates resistance to the lure to dive to a predetermined depth and swim at that depth. A diving depth of the lure can be adjusted by, for example, setting a size of the lip part and a projection angle of the lip part. In general, the larger the lip part is, the higher the water pressure applies. Thus, the diving depth of the lure tends to become deeper.

Patent Literature 1: JP 2001-292662 A

SUMMARY OF INVENTION

As described above, the lip part is provided on the body to add to the lure a function to dive and swim at the predetermined depth in water. Thus, the lip part is not found in a real bait. Such a lip part is not provided with a function to attract fish. In fact, the lip part may give an unnecessary cautious on a target fish.

Technical Problem

An object of the present invention is to provide a lure which is highly effective in attracting a target fish by using a lip part.

Solution to Problem

A lure of the present invention includes a body, and a lip part projecting from the body, wherein the lip part is provided with a hologram sheet.

In a preferred lure of the present invention, a main part of the lip part is transparent, the hologram sheet is transparent, and the transparent hologram sheet is attached to the transparent main part of the lip part.

In a preferred lure of the present invention, the main part of the lip part is projected from a front portion of the body, and the hologram sheet is attached to a surface of the main part of the lip part.

In a preferred lure of the present invention, a lower face of the main part of the lip part is formed in a polyhedral shape.

Advantageous Effects of Invention

In the lure of the present invention, the lip part projecting from the body is provided with the hologram sheet. With such a lure, the hologram sheet either reflects or does not reflect light in water, and thus, a target fish sees it as if the light is flashing at a separate location from the body (at the lip part). For that reason, the lure of the present invention is more likely to draw an interest from a target fish and is highly effective in attracting the target fish.

Further, in a preferred lure of the present invention, the transparent hologram sheet attached to the transparent main part of the lip part makes the lure look small to the target fish.

DESCRIPTION OF EMBODIMENTS

Hereinafter, the present invention will be described with reference to the drawings.

In this specification, front and back and upper and lower are used as a term for describing directions. A front side is a side for which a lure is headed when pulled by a line (fishing line) connected to the lure during use, and a back side is a side opposite to the front side. An upper side is noted in the coordinate system shown in FIG. 3, and a lower side is the side opposite to the upper side.

First Embodiment

Figure 1:
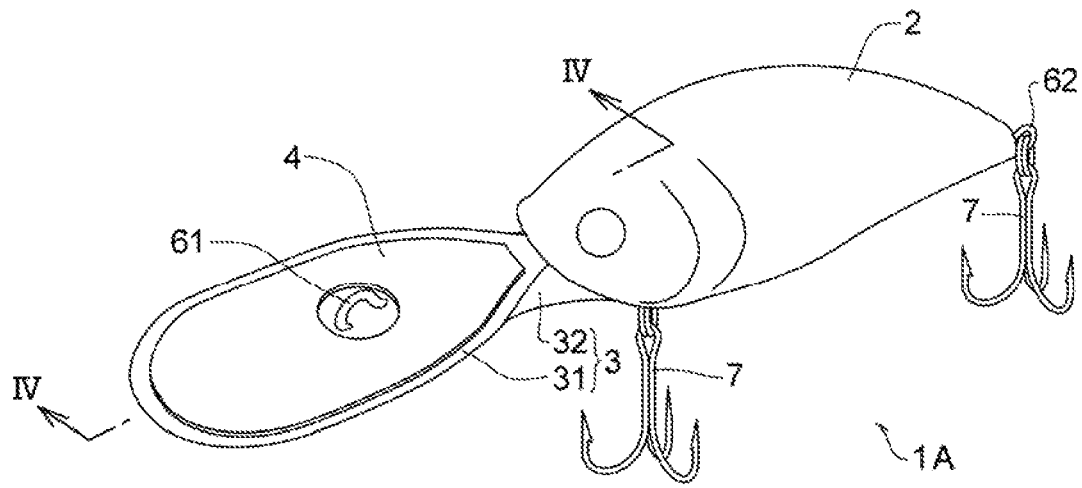
FIG. 1 is a perspective view of a lure according to a first embodiment of the present invention.
Figure 2:
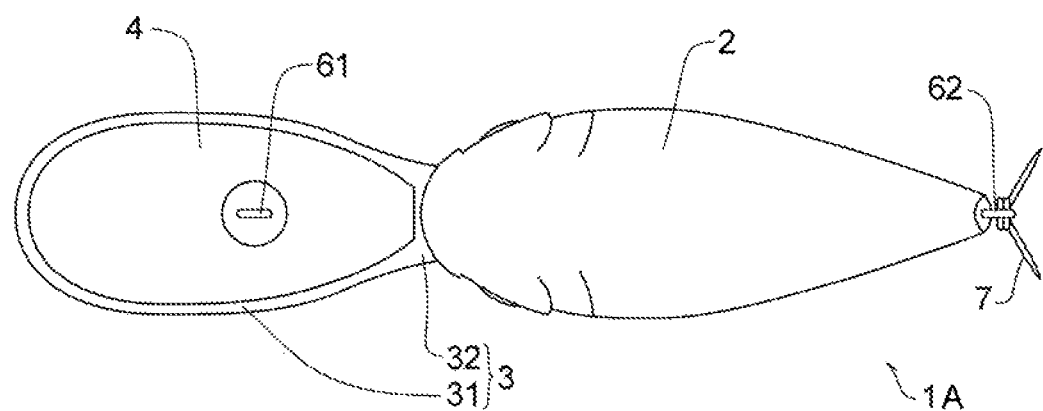
FIG. 2 is a plan view of the lure according to the first embodiment of the present invention when viewed from an upper side of the lure.
Figure 3:
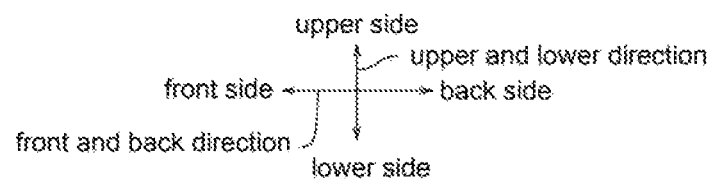
FIG. 3 is a right-side view of the lure according to the first embodiment of the present invention.
Figure 3:
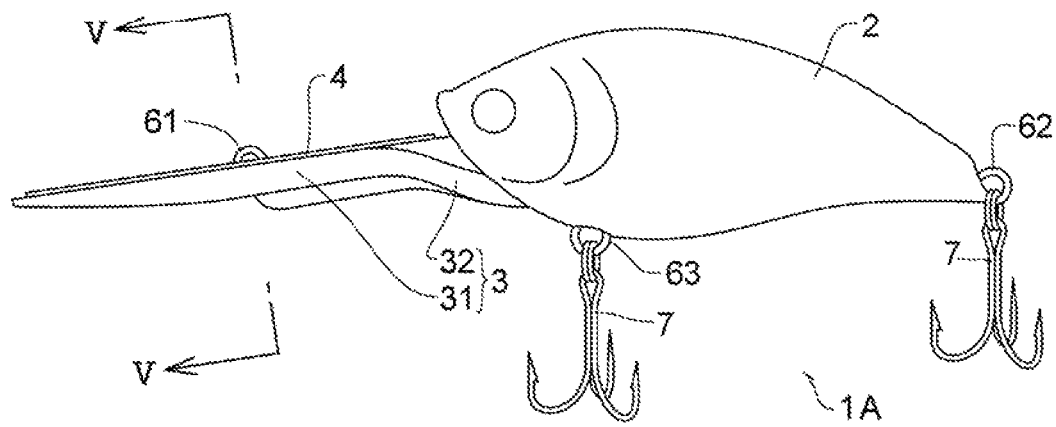
Figure 4:
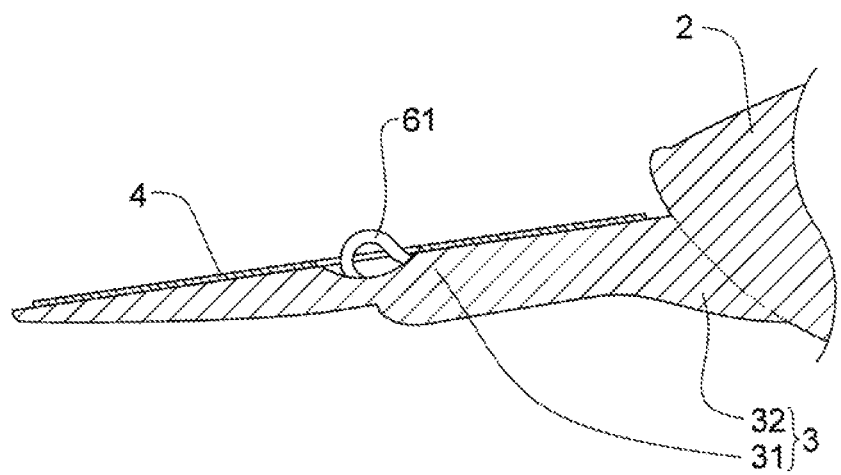
FIG. 4 is an enlarged cross-sectional view taken along a line IV-IV of FIG. 1.
Figure 5:
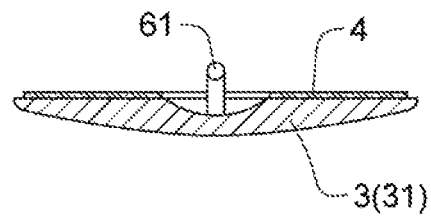
FIG. 5 is an enlarged cross-sectional view taken along a line V-V of FIG. 3.

FIG. 1 is a perspective view when viewed from an obliquely upper side of a front side of a lure of a first embodiment, FIG. 2 is a plan view when viewed from an upper side toward a lower side of the lure of FIG. 1, FIG. 3 is a side view when viewed from a right side of the lure of FIG. 1, and FIG. 4 and FIG. 5 are enlarged cross-sectional views prepared by cutting a lip part and enlarging the cut surface of the lip part.

FIG. 1 to FIG. 5 relate to a lure 1A. The lure 1A has a body 2, a lip part 3 projecting from the body 2, and a hologram sheet 4 provided on the lip part 3.

The body 2 as illustrated has a shape that mimics a small fish. However, the shape of the body 2 is not limited to the shape similar to a small fish and may be a shape that mimics a shrimp, a shape that mimics a frog, or the like. The shape of the body 2 is not limited to the shape that mimics a natural object such as a small fish, and the body 2 may be formed in any shape.

Further, the body 2 may have an outer face on which an infinite number of small indentations (dimples) are formed (not illustrated). With the infinite number of small indentations on the outer face of the body 2, the lure 1A is less likely to get air resistance when the lure 1A is casted.

The body 2 itself may be formed to sink in water (including fresh water and seawater) or may be formed to float in water. Preferably, the body 2 is formed to float in water.

A specific gravity of the body 2 which floats in water is less than 1, preferably 0.9 or less, more preferably 0.8 or less, and particularly preferably 0.6 or less, for example.

A formation material of the body 2 is not limited to a particular material, and a conventionally known material can be used. Examples of the formation material of the body 2 include a hard synthetic resin such as an ABS resin, a soft synthetic resin such as urethane, a foamed synthetic resin such as foamed urethane, wood, and a composite material produced by combining two or more materials.

The body 2 may be formed of a formation material having a specific gravity of more than 1 or a formation material having a specific gravity of less than 1.

The body 2 may be hollow or solid. A solid body 2 means that there is no hollow portion inside the body.

Preferably, the body 2 has a hollow portion inside (that is, the body 2 is hollow). The body 2 having a specific gravity of less than 1 can be prepared by forming a hollow portion inside the body 2 even if a formation material having a specific gravity of more than 1 (such as an ABS resin) is used. The hollow body 2 is formed of, for example, a hard synthetic resin such as an ABS resin.

A ring-like line connecting part 61 is provided on a front portion of the body 2 for connecting a line. The line connecting part 61 is constituted of a ring-like part projecting from the body 2 or the lip part 3.

Further, a fish hook connecting part 62 is provided on a back portion of the body 2 for connecting a fish hook 7. Similarly, a fish hook connecting part 63 is provided on a lower middle portion of the body 2 for connecting the fish hook 7. The fish hook connecting part 62 and the fish hook connecting part 63 are each constituted of, for example, a ring-like part projecting from the body 2.

These fish hooks 7 are fish hooks having a hook-like shape, for example (examples include a treble hook), and are connected to the fish hook connecting parts 62 and 63, respectively.

Although not illustrated in the drawings, the body 2 may have a conventionally known configuration. Examples of the conventionally known configuration of the body 2 include a sinker for adjusting buoyancy, a ball for shifting a center of gravity, a rattle ball for producing an impact sound, and a fin-shaped member.

As illustrated in FIG. 1 to FIG. 4, the lip part 3 is projected from an end of the body 2.

For example, the lip part 3 is projected forward from the front portion of the body 2.

Specifically, the lip part 3 has a main part 31, which mainly comes under pressure of water, and a connector part 32 for connecting the main part 31 and the body 2.

The main part 31 of the lip part 3 has a substantially plate shape on the whole. An upper face (the face located in an upper side) of the main part 31 of the lip part 3 is formed in a substantially flat shape, for example. The upper face of the main part 31 may be formed in a substantially arc shape or a polyhedral shape such as a substantially triangular roof-like shape (not illustrated).

Further, a lower face (the face located in a lower side) of the main part 31 of the lip part 3 is formed in a substantially arc shape. The lower face of the main part 31 may be formed in a substantially flat shape (not illustrated).

A lower face of the connector part 32 is also formed in a substantially arc shape. The lower face of the connector part 32 may be formed in a substantially flat shape (not illustrated).

One side of the connector part 32 is fixed to a front end of the body 2, and the other side of the connector part 32 is fixed over a back end to a middle portion of the lower face of the main part 31.

The lip part 3 may be integrally formed with the body 2 or may be formed separately from the body 2.

The illustrated example of the lip part 3 is integrally formed with the body 2. That is, the lip part 3 and the body 2 are formed by molding a single material. In the integrally formed lip part 3 and the body 2, a structural boundary between the lip part 3 and the body 2 does not appear clearly. However, the boundary between the integrally formed lip part 3 and the body 2 is indicated with a short-dashed line shown in FIG. 4 for the purpose of convenience.

The lip part 3 may be either transparent or opaque. Preferably, at least the main part 31 is transparent, and more preferably, the main part 31 and the connector part 32 are transparent. This is because the lip part 3 is a part that is not present in a real bait, and if the presence of the main part 31 is sensed by a fish, there is a risk that the target fish will be unnecessary cautious. The transparent lip part 3 is less likely to be seen by the target fish, and especially a colorless and transparent lip part 3, which is as clear as fresh water, is less likely to be seen by the target fish.

When the lip part 3 and the body 2 are integrally formed of a single material, the lip part 3 and the body 2 generally have the same transparency. For that reason, when the lip part 3 is formed to be transparent, the body 2 is also transparent. Such a transparent body 2 is decorated with a desired decoration including coating with ink and attaching a design sheet (decoration is not illustrated).

In this specification, one member being "transparent" means that the member is in a state where any number (font size of 12 points) printed on a sheet of white paper with black ink is visible through a surface of the member when the member is placed on that sheet of white paper, and being "opaque" means that the member is in a state where the number, which is prepared in the same manner as above, at the back of the member is invisible (a state where the number is not recognizable). The term "transparent" means either colorless and transparent or colored and transparent (a transparent state with some kind of color).

The main part 31 of the lip part 3 is formed in a substantially elliptical shape when viewed from an upper face side. The shape of the main part 31 is not limited to the substantially elliptical shape in a planar view, and the main pal 31 may be formed in any shape including a substantially rectangular shape, a substantially triangular shape, and a substantially circular shape.

As illustrated in FIG. 3, the lip part 3 is projected obliquely downward. The lip part 3 projecting obliquely downward is produced by projecting the lip part 3 by forming an acute angle with respect to a front and back direction of the body 2.

A diving depth of the hire 1A can be set by appropriately adjusting, for example, a size of the upper face (area) of the main part 31 of the lip part 3, a shape of the main part 31, and a projection angle of the lip part 3.

In this embodiment, the line connecting part 61 is provided on an upper face of the lip part 3 projected forward from the body 2.

The lip part 3 is provided with the hologram sheet 4. A hologram sheet is also referred to as a hologram film, a holographic sheet, or a holographic film, and the hologram sheet itself is publicly known.

The hologram sheet is prepared by applying holography basis to a sheet, and it is a special sheet having a property of reflecting incident light.

Regarding the hologram sheet 4, reflection (or diffraction) of light varies depending on an angle from which it is viewed, and the hologram sheet 4 refers to a sheet which looks shiny by reflected light or/and an interference pattern.

As the hologram sheet 4, either a transparent hologram sheet or an opaque hologram sheet may be used. However, the transparent hologram sheet is preferably used.

The transparent hologram sheet refers to a sheet which is transparent when viewed from one angle with respect to a surface of the sheet (in a state where the back of the hologram sheet can be seen through), but becomes opaque due to reflection of light when changing the angle from which it is viewed (in a state where the back of the hologram sheet cannot be seen through). The transparent hologram sheet is preferably a sheet on which a color of reflected light varies (wavelength of the reflected light varies) depending on an angle from which it is viewed. For example, a preferred transparent hologram sheet is transparent when viewed from a direction perpendicular to the surface of the sheet, becomes opaque due to the reflection of light when an angle from which it is viewed is changed, and is a sheet on which a color of reflected light varies depending on an angle from which it is viewed. Further, a more preferred transparent hologram sheet is colorless and transparent when viewed from a direction perpendicular to the surface of the sheet, becomes opaque due to the reflection of light when an angle from which it is viewed is changed, and is a sheet on which a color of reflected light varies depending on an angle from which it is viewed.

The opaque hologram sheet refers to a sheet which is opaque due to the reflection of light when viewed from any angle with respect to the surface of the sheet and on which a color of the reflected light varies (wavelength of the reflected light varies) depending on an angle from which it is viewed.

The hologram sheet 4 is preferably attached to a surface of the lip part 3. Examples of an attachment means are not limited to a particular means and include use of a gluing agent or an adhesive and thermal transfer (so-called hot stamping).

In this embodiment, the hologram sheet 4 is attached to the surface of the lip part 3 with an adhesive. The surface of the lip part 3 includes an upper face and a lower face of the main part 31 of the lip part 3, and in this embodiment, the hologram sheet 4 is attached to the upper face of the surface of the main part 31 of the lip part 3.

The hologram sheet 4 may be provided substantially across the upper face of the main part 31 of the lip part 3 or may be partially provided on the upper face of the main part 31.

In this embodiment in which the line connecting part 61 is projected from the upper face of the main part 31 of the lip part 3, the hologram sheet 4 is attached to substantially the entire upper face of the main part 31 of the lip part 3 except for the periphery of the line connecting part 61.

A thickness of the hologram sheet 4 is not limited to a particular thickness and is 10 μm to 1 mm, and preferably 20 μm to 300 μm, for example.

The lure 1A is used by connecting a line to the line connecting part 61. When the lure 1A is pulled (when the lure 1A is retrieved) after casting the lure 1A in water, the lure 1A pulled by the line dives to a predetermined depth in water and swims at that depth while getting resistance created by the lip part 3.

In the lure 1A of the present invention, since the hologram sheet 4 is provided on the lip part 3 projecting from the body 2, the hologram sheet 4, which is provided at a separate location from the body 2 (lip part 3), may reflect or not reflect light in water in a direction toward a place where a target fish swims. For the target fish, such a reflection and non-reflection of the light from the hologram sheet 4 appear as if the light is flashing at a separate location from the body 2 (the target fish sees the light as if the light is flashing, and this may be referred to as a "flashing action" in some cases below). For that reason, the target fish shows an interest in the light, which allows the lure 1A to draw the target fish toward the lure 1A.

Since the transparent lip part 3 is provided with the transparent hologram sheet 4, the flashing action becomes particularly great.

In general, drawing a target fish toward a lure can be broadly divided into steps including a step where the lure lands in water and dives to a predetermined depth, a step where the lure swims at the predetermined depth, and a step where the lure and a target fish are at their closest approach.

A conventional lure cannot draw a target fish in the step where the lure lands in water and dives to a predetermined depth. That is, it is a waste of time for the conventional lure to go through the step where the lure lands in water and dives to a predetermined depth. In this respect, the lure 1A of the present invention can attract a target fish by the flashing action even in the step of landing in water and diving to the predetermined depth. This allows a longer time in attracting a target fish in one casting.

The target fish such as black bass and sea bass has a habit of snuggling in shadows in water to wait for a bait fish. Thus, a hire is often casted further than the place where the target fish swims and retrieved so that the lure is pulled toward the target fish. In this case, the lure approaches the target fish by facing its front portion. That is, in the step where the lure swims at the predetermined depth, the lure is often retrieved so that the lure approaches the target fish by facing its front portion. In the present invention, the hologram sheet 4 is provided on the lip part 3 projected from the front portion of the body 2 of the lure 1A, the target fish sees the approaching lure 1A as if the lure 1A is flashing. Thus, the target fish easily notices and shows an interest in the lure 1A.

When the lure 1A is retrieved, the lure 1A swims while wobbling left and right. Since the lure 1A is provided with the transparent hologram sheet 4 on the transparent lip part 3, the reflection of light is minimized and the hologram sheet 4 becomes transparent when viewed from one angle, and the light is reflected from the hologram sheet 4 when viewed from a different angle. Such a lure 1A appeals to a target fish swimming in front of the lure 1A by flashing light. In addition to that, the lip part 3 becomes invisible from the target fish as the lure 1A has the transparent hologram sheet 4 and the transparent lip part 3, which makes the lure look small to the target fish.

In the step where the lure and the target fish are at their closest approach, the target fish and the lure are substantially horizontally adjacent to each other (in a state where they are in an approximately horizontal position). In this respect, when the target fish comes closest to the lure 1A, it is hard for the target fish to see the reflection and non-reflection of light caused by the lip part 3 of the lure 1A of the present invention. That is, the flashing action is weak and the hologram sheet 4 is less visible in the step where the lure and the target fish are at their closest approach. Further, as the lip part 3 is transparent, the target fish is less likely to notice the lip part 3 and the hologram sheet 4 in the step where the lure and the target fish are at their closest approach, which allows the target fish to easily bite on the lure 1A.

The lure 1A, in which the lip part 3 is provided with the hologram sheet 4, as in the present invention is more effective in attracting a target fish than the lure in which a hologram sheet is provided inside a body.

The body is generally coated with ink or decorated with a design sheet to make it look like a bait such as a small fish (a bait for a target fish), and thus, light reflectance is small. Further, a target fish has recently been becoming used to a lure and has not much interest in the lure even if the target fish sees reflection and non-reflection of light from the body produced by mimicking a shape of a bait for the target fish. In this respect, the lure 1A of the present invention causes the flashing action not at the body 2 itself but at a separate location from the body 2 by including the hologram sheet 4 in the lip part 3 which is a part projecting from the body 2. In particular, in the case of the colorless and transparent lip part 3, since the lip part 3 is not visible to the target fish, the flashing action occurs at a position completely separated from the body 2. For that reason, the lure of the present invention in which the lip part is provided with the hologram sheet is more likely to draw an interest from a target fish than the hire in which a hologram sheet is provided inside a body.

In particular, with the lure 1A in which the main part 31 of the lip part 3 has a substantially flat upper surface on which the hologram sheet 4 is attached, the hologram sheet 4 easily gets sunlight in water, which thus enhances the flashing action.

The configuration of the lure of the present invention is not limited to the configuration described in the first embodiment and may be modified to various configurations. Hereinafter, differences in configuration between the first embodiment and the other embodiments will be mainly described, description of similarities is omitted, and the terms in the first embodiment may be cited in the other embodiments.

Second Embodiment

Figure 6:
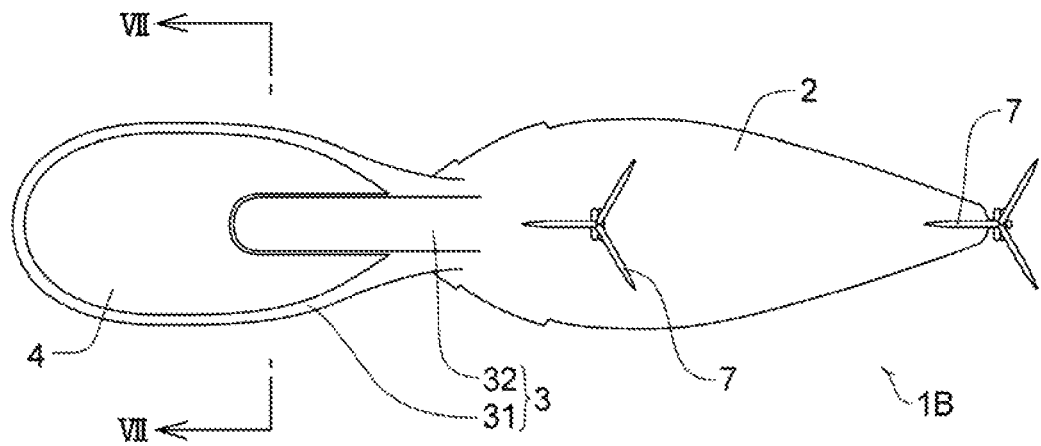
FIG. 6 is a bottom view of a lure according to a second embodiment when viewed from a lower side of the lure.
Figure 7:
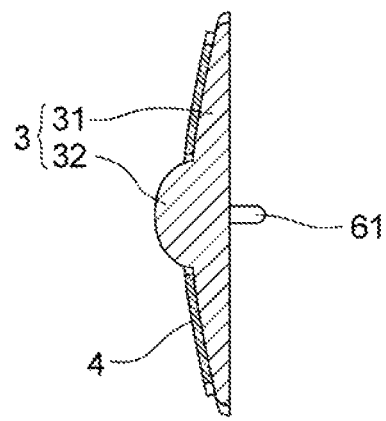
FIG. 7 is an enlarged cross-sectional view taken along a line VII-VII of FIG. 6.

FIG. 6 is a bottom view when viewed from a lower side to an upper side of a lure of a second embodiment, and FIG. 7 is an enlarged cross-sectional view prepared by cutting the lip part of FIG. 6 and enlarging the cut surface of the lip part.

In a lure 1B of the second embodiment, a hologram sheet 4 is attached to a lower face of a lip part 3. Since a connector part 32 of the lip part 3 expands from a lower face of a main part 31, the hologram sheet 4 as illustrated is attached substantially the entire lower face of the main part 31 except for the connector part 32 of the lip part 3. However, the hologram sheet 4 may be partially attached to the lower face of the main part 31 (not illustrated).

The lure 1B of the second embodiment was prepared in the same manner as in the first embodiment except for the position of the hologram sheet 4.

The lure 1B of the second embodiment is also highly effective in attracting a target fish by the flashing action.

In the lure 1B of the second embodiment, since the hologram sheet 4 is attached to the lower face of the main part 31 of the lip part 3, the hologram sheet 4 is less likely to come off even if the lure 1B comes in contact with a rock or a sunken foreign object on the seabed.

Although not illustrated in the drawings, the hologram sheet 4 may be attached to both an upper face and the lower face of the main part 31.

Third Embodiment

Figure 8:
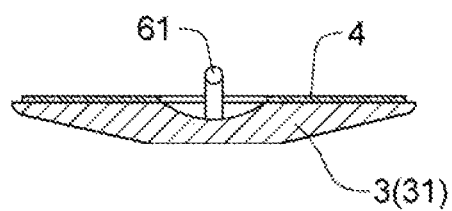
FIG. 8 is an enlarged cross-sectional view of a lip part of a lure according to a third embodiment.

FIG. 8 is an enlarged cross-sectional view prepared by cutting a lip part and enlarging the cut surface of the lip part of a lure of a third embodiment. This cross-sectional view is prepared by cutting along the line, which is the same line as the V-V line of FIG. 3, of the lip part of the lure of the third embodiment.

The lip part 3 of the lure in the first and second embodiments has the lower face (the face located in a lower side) formed in an arc-like shape. However, as illustrated in FIG. 8, a lower face of the lip part 3 may be formed in a polyhedral shape, for example. The polyhedral shape is multifaceted when viewed three-dimensionally and has polygonal lines when viewed cross-sectionally. The illustrated example shows a case where the lower face of the lip part 3 is formed to have a trihedral shape (shape having three faces). However, the lower face of the lip part 3 may be formed to have a dihedral shape (shape having two faces like a triangular roof-like shape), a tetrahedral shape (shape having four faces), a pentahedral shape (shape having five faces), a hexahedral shape (shape having six faces), or the like.

Although not illustrated in the drawings, a lower face of a connector part 32 may be formed in a polyhedral shape.

When at least one of the lower face of the lip part 3 and the lower face of the connector part 32 is formed in a polyhedral shape, light reflected from the hologram sheet 4 is easily dispersed due to a prismatic effect.

Fourth Embodiment

Figure 9:
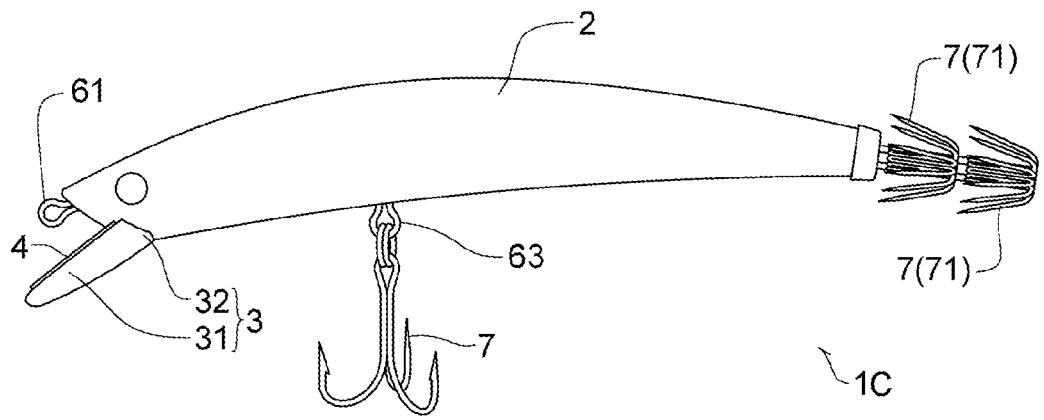
FIG. 9 is a side view of a lure according to a fourth embodiment.

FIG. 9 illustrates a lure 1C of a fourth embodiment.

The lure 1C of the fourth embodiment has the following differences when comparing to the lures of the first to third embodiments, and the other configurations of the fourth embodiment are the same as those of the first to third embodiments.

In the lure 1C of the fourth embodiment, a body 2 running in a front and back direction has a long and thin shape, a lip part 3 is relatively small, and an umbrella-shaped fish hook 71 as a fish hook 7 is fixed to the body 2. Further, as for the present embodiment, the lure having a line connecting part 61 projecting from the body 2 is illustrated.

The lure 1C of the fourth embodiment is also highly effective in attracting a target fish by the flashing action.

Fifth Embodiment

Figure 10:
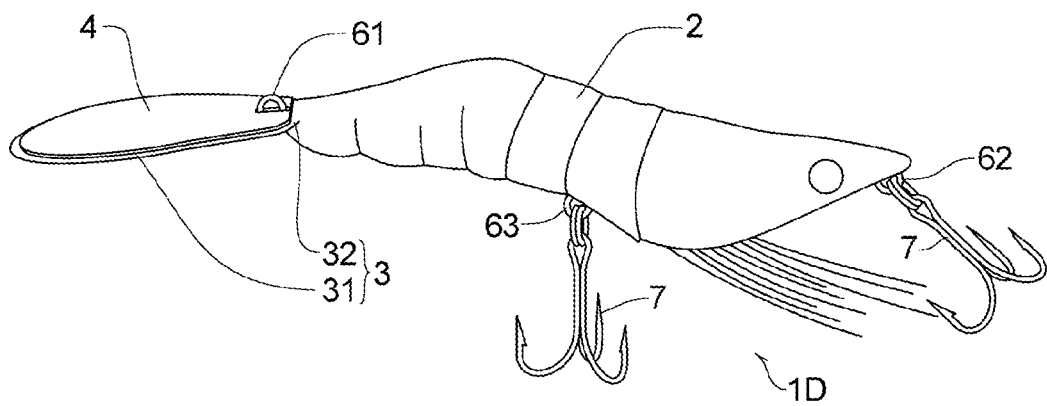
FIG. 10 is a side view of a lure according to a fifth embodiment.

FIG. 10 illustrates a lure 1D of a fifth embodiment.

The lure 1D of the fifth embodiment is a different in that a body 2 is formed in a shape that mimics a shrimp when comparing to the lures of the first to fourth embodiments, and the other configurations are the same as those of the first to fourth embodiments.

The lure 1D of the fifth embodiment is also highly effective in attracting a target fish by the flashing action.

Further, according to the present invention, two or more embodiments selected from the various embodiments described above may be combined as appropriate, and alternatively, one or more configurations selected from the various embodiments described above may be replaced with those of the other embodiments.

INDUSTRIAL APPLICABILITY

The lure of the present invention can be used for fishing of various targets such as black bass, sea bass, dorado, octopus, and squid.

1A, 1B, 1C, 1D Lure
2 Body
3 Lip part
4 Hologram sheet

The invention claimed is:

1. A lure comprising:
a body; and
a lip part having a main part projecting from a front portion of the body, wherein
the main part of the lip part is transparent,
a line connecting part is provided on an upper face of the main part, and
a transparent hologram sheet is attached to the upper face of the transparent main part of the lip part.

2. The lure according to claim 1, wherein the transparent hologram sheet is attached to substantially an entirety of the upper face of the main part except for a periphery of the line connecting part.

3. The lure according to claim 1, wherein a lower face of the main part of the lip part has a substantially arc shape.

4. The lure according to claim 1, wherein the lip part includes a connector part at a lower face of the main part connecting the main part and the body.

5. The lure according to claim 4, wherein the connector part extends from the body to a middle portion of the lower face of the main part located under the line connecting part.

6. The lure according to claim 4, wherein the connector part extends from the body to a middle portion of the lower face of the main part.

7. The lure according to claim 1, wherein the main part mainly encounters water pressure.

8. The lure according to claim 1, wherein the line connecting part is positioned on the upper face of the main part at a location between a center of the main part and the body.

9. The lure according to claim 1, wherein the line connecting part is positioned on the upper face of the main part so that the line connecting part guides the lure to encounter water pressure mainly at the main part.

10. A lure comprising:
a body; and
a lip part having a main part projecting from a front portion of the body and a connector part connecting the main part and the body, wherein
the main part of the lip part is transparent,
a line connecting part is provided on an upper face of the main part at a position that guides the lure to encounter water pressure mainly at the main part,
a transparent hologram sheet is attached to substantially an entirety of the upper face of the main part except for a periphery of the line connecting part, and
the connector part extends from the body to a middle portion of a lower face of the main part located under the line connecting part.

* * * * *